US012209772B2

(12) United States Patent
Deivasigamani et al.

(10) Patent No.: US 12,209,772 B2
(45) Date of Patent: Jan. 28, 2025

(54) FLUID SYSTEM POWER-ON SELF TEST

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 480 days.

(21) Appl. No.: 17/712,162

(22) Filed: Apr. 3, 2022

(65) Prior Publication Data

US 2023/0314045 A1    Oct. 5, 2023

(51) Int. Cl.

| F24H 15/104 | (2022.01) |
|---|---|
| F16K 37/00 | (2006.01) |
| G01F 25/10 | (2022.01) |
| G01L 27/00 | (2006.01) |

(52) U.S. Cl.
CPC ....... *F24H 15/104* (2022.01); *F16K 37/0091* (2013.01); *G01F 25/10* (2022.01); *G01L 27/007* (2013.01)

(58) Field of Classification Search
CPC ........ F24H 15/104; G01F 1/34; G01F 15/005; G01F 15/06; G01F 25/10; G01F 1/363; G01F 5/00; F16K 37/0091; G01L 27/007
See application file for complete search history.

(56) References Cited

U.S. PATENT DOCUMENTS

| 3,786,921 | A | * | 1/1974 | Johnson | .................. | E04H 4/129 |
|---|---|---|---|---|---|---|
| | | | | | | 210/130 |
| 9,645,584 | B2 | * | 5/2017 | Kucera | .................. | F23N 1/002 |
| 11,567,515 | B2 | * | 1/2023 | Deng | .................. | F16K 31/1245 |
| 2010/0206869 | A1 | * | 8/2010 | Nelson | .................. | F24H 15/136 |
| | | | | | | 392/441 |
| 2011/0205265 | A1 | * | 8/2011 | Furukawa | ................ | B41J 2/175 |
| | | | | | | 347/6 |
| 2017/0184008 | A1 | * | 6/2017 | Nagai | ........................ | F01P 3/02 |
| 2019/0242618 | A1 | * | 8/2019 | Deivasigamani | ..... | F24H 15/174 |
| 2021/0018943 | A1 | * | 1/2021 | Deng | .................. | G05D 16/166 |
| 2021/0381207 | A1 | * | 12/2021 | Brotherton | .............. | E03B 7/071 |
| 2022/0049478 | A1 | * | 2/2022 | Mason | ................ | G01M 3/2815 |
| 2022/0051351 | A1 | * | 2/2022 | Mason | .................... | G01F 1/662 |
| 2023/0008269 | A1 | * | 1/2023 | Deivasigamani | ... | G01M 3/2815 |
| 2023/0127979 | A1 | * | 4/2023 | Driscoll | ................. | G05B 19/43 |
| 2023/0358581 | A1 | * | 11/2023 | Deivasigamani | ....... | G01F 15/06 |

\* cited by examiner

*Primary Examiner* — Shelby A Turner
*Assistant Examiner* — Yaritza H Perez Bermudez
(74) *Attorney, Agent, or Firm* — Jong Patent Firm; Cheng Ning Jong; Tracy P. Jong

(57) ABSTRACT

A diagnostic method for verifying the proper functioning of a fluid flow control device of a fluid system, the method including determining whether at least one pressure sensor is functional and if the at least one pressure sensor is considered functional, determining whether a bypass valve is functional and if the bypass valve is considered functional, determining whether at least one flow sensor is functional, if the at least one flow sensor is considered dysfunctional, a flow sensor fault is raised; and otherwise if the at least one pressure sensor is considered dysfunctional, using the at least one flow sensor to determine whether the bypass valve is functional, if the bypass valve is considered functional, determining whether at least one pump is functional, a pump alert is raised if the at least one pump is considered dysfunctional.

2 Claims, 3 Drawing Sheets

FLUID SYSTEM POWER-ON SELF TEST

BACKGROUND OF THE INVENTION

1. The Field of the Invention

The present invention relates generally to a diagnostic method for an appliance. More specifically, the present invention is directed to a fluid system power-on test configured to detect fluid system anomalies during power-on such that these anomalies may be addressed timely and such that alternative control strategies can be implemented in the interim.

2. Background Art

In a conventional fluid system, the health of the system is not actively verified prior to the system being put in use to service customers. Errors that occur and detected during normal operations can cause unplanned equipment shutdown over a prolonged period of time and untold economic impacts. Further, if no plans are put in place to aid a system in "limping along" until further corrective actions can be taken, a prolonged shutdown can exacerbate the problem, especially when the same fluid system also serves numerous customers.

There exists a need for a fluid system capable of self-tests and one capable of self-tests at opportune times so as to hasten the discovery of problems associated with the fluid system and that the problems may be addressed timely.

SUMMARY OF THE INVENTION

In accordance with the present invention, there is provided a diagnostic method for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, the method including:
  (a) determining whether the at least one pressure sensor is functional and if the at least one pressure sensor is considered functional, determining whether the at least one pump is functional and if the at least one pump is considered functional, determining whether the bypass valve is functional and if the bypass valve is considered functional, determining whether the at least one flow sensor is functional, if the at least one flow sensor is considered dysfunctional, a flow sensor fault is raised; and
  (b) otherwise if the at least one pressure sensor is considered dysfunctional, using the at least one flow sensor to determine whether the at least one bypass valve is functional, if the bypass valve is considered functional, determining whether the at least one pump is functional, a pump alert is raised if the at least one pump is considered dysfunctional.

In one embodiment, the determining whether the at least one pump is functional includes determining whether a pressure increase of at least about 5 psi in the fluid flow has been detected. In one embodiment, the determining whether the at least one flow sensor is functional includes determining whether the fluid flow is detected for about 5 seconds and the flowrate of the fluid flow is at least about 1 GPM. In one embodiment, the determining whether the at least one bypass valve is functional in step (a) includes determining whether a pressure change as detected by the at least one pressure sensor of over about 2 psi and a flowrate of the fluid flow over about 3.5 GPM as detected by the at least one flow sensor have occurred. In one embodiment, the determining whether the at least one bypass valve is functional in step (b) includes determining whether a flowrate of the fluid flow as detected by the at least one flow sensor has decreased by about 0.5 GPM. In one embodiment, the determining whether the at least one pump is functional in step (b) includes determining whether a flowrate of the fluid flow increases by about 1 GPM. In one embodiment, the determining whether the at least one flow sensor is functional includes determining whether the fluid flow has been detected to be in existence for at least about 10 seconds.

In accordance with the present invention, there is further provided a diagnostic method for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow, at least one valve open switch for detecting a valve open condition and at least one flow sensor for obtaining a flowrate of the fluid flow, the method including:
  (a) opening the at least one flow valve;
  (b) determining whether the at least one valve open switch detected a valve open condition, if the valve open condition is detected, determining whether the at least one pressure sensor is functional, otherwise using a valve handler to exercise the at least one flow valve, if the at least one pressure sensor is considered functional and the at least one pressure sensor indicates a proper pressure, turning on the at least one pump, otherwise defaulting to flow sensing, if a sufficient pressure increase in the fluid flow is detected by the at least one pressure sensor after turning on the at least one pump, otherwise a pump alert is raised, if the pressure of the fluid flow as sensed by the at least one pressure sensor increases sufficiently, the at least one pump and the at least one bypass valve are considered functional, if an insufficient flowrate of the fluid flow is detected, a flow sensor fault is raised; and
  (c) during flow sensing, determining whether the bypass valve is functional if the pressure sensor is considered dysfunctional, if the bypass valve is considered functional, determining whether the at least one pump is functional, otherwise a bypass valve alert is raised, if the at least one pump is considered dysfunctional, a pump alert is raised.

In one embodiment, the sufficient pressure increase in the fluid flow is a pressure increase of at least about 5 psi. In one embodiment, the sufficient flowrate of the fluid flow is at least about 1 GPM. In one embodiment, the fluid flowrate of the at least one flow sensor drops sufficiently is a drop of at least about 0.5 GPM. In one embodiment, if the at least one pump is considered dysfunctional, the flowrate of the fluid flow does not increase by at least about 1 GPM.

An object of the present invention is to provide a diagnostic method useful for identifying the specific component/s or device/s of a system which have malfunctioned such that the downtime of the system relying on the proper functioning of specific component/s or device/s can be minimized by communicating these malfunctions to service personnel in their presence.

Another object of the present invention is to provide a diagnostic method useful for identifying the specific component/s or device/s of a system which have malfunctioned such that the system can continue to function based on alternative component/s or device/s while the malfunctioned component/s or device/s are awaiting service or repair at a later time.

Another object of the present invention is to provide service personnel sufficient information regarding the malfunctions of a system to remove the need for an additional on-site diagnosis to identify the malfunctions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
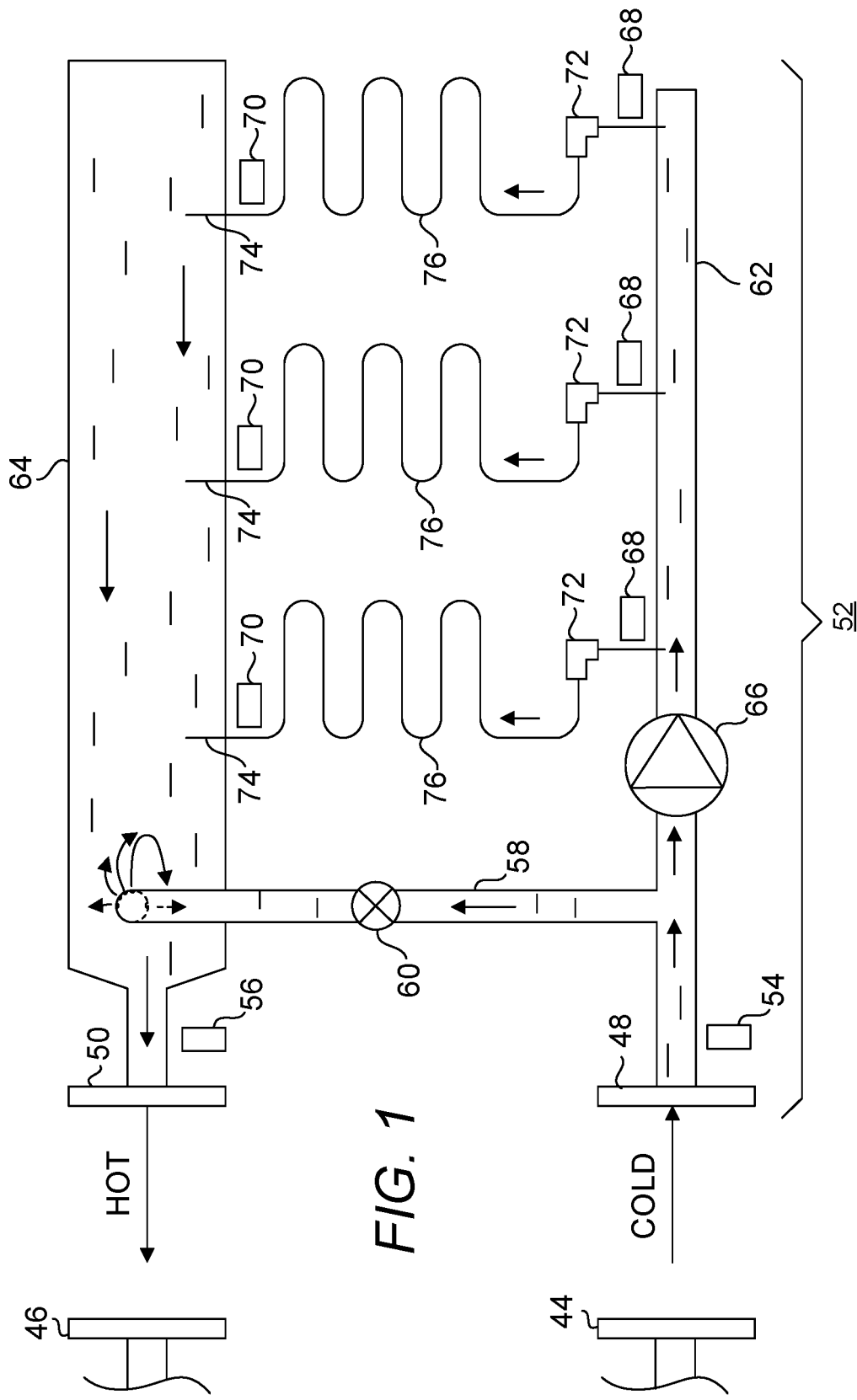
FIG. 1 is a diagram depicting one embodiment of a water heating system where one or more heat exchangers are used and the water heating system includes a bypass conductor.

2—diagnostic method for determining whether flow devices of a fluid system function properly
4—state of bypass valve and pump disposed in off condition
6—step of opening all water valves
8—step of checking pressure of fluid system
10—step of taking pressure sensor readings
12—step of taking pressure sensor readings after a delay
14—step of energizing pump and taking pressure sensor readings and checking whether pump functions properly
16—step of raising a pump alert
18—step of energizing bypass valve and checking whether bypass valve functions properly
20—step of raising a bypass alert
22—state indicating bypass valve is functional
24—step indicating flow sensor does not function properly
26—state indicating flow sensor is functional
28—path of diagnostic method that is taken when pressure sensor has been determined to fail to function properly
30—step of causing valve open handler to continue to open valve until timeout fault or until alert mode is activated
32—step in which "valve unable to open" fault is raised
33—step in which sensor handler defaults to flow sensing
34—step where a significant flow has not been detected in the fluid system
36—step in which bypass valve is opened and flowrate through one or more heat exchangers is checked to determine whether flowrate through the one or more heat exchangers has dropped sufficiently
38—step in which bypass valve alert is raised and bypass valve is de-energized
40—step in which pump is energized and flowrate through one or more heat exchangers is checked to determine whether flowrate through the one or more heat exchangers has increased sufficiently or significantly
42—state indicating bypass valve and pump are functional
44—cold water supply manifold
46—hot water supply manifold
48—receiving end of cold side conductor
50—exit end of hot side conductor
52—water heating system
54—system inlet temperature sensor
56—system outlet temperature sensor
58—bypass conductor
60—valve
62—cold side conductor
64—hot side conductor
66—pump
68—heat exchanger inlet temperature sensor
70—heat exchanger outlet temperature sensor
72—package including flow valve, flow sensor
74—exit nozzle of heat exchanger

PARTICULAR ADVANTAGES OF THE INVENTION

The present method is useful for identifying the specific component/s or device/s of a system which have malfunctioned. If the system is incapable of meeting a demand as it cannot be turned on to meet the demand, the downtime of the system relying on the proper functioning of specific component/s or device/s can be minimized by simply power-cycling (or power off and power on) the fluid system. As the malfunctions are communicated to service personnel during the power-up process of the fluid system, the system can be repaired and put back in service as soon as possible while the service personnel are still setting up or commissioning the fluid system.

The present diagnostic method is useful for identifying the specific component/s or device/s of a system which have malfunctioned during the power-up phase of the system, i.e., a phase of a normal power-up of the system upon installation. The malfunctions are timely and efficiently identified as part of a normal power-up operation of the system. Further, the skill level required of the service personnel responsible for servicing a fluid system can be drastically reduced as the diagnostic method aids in identifying one or more problematic flow devices.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a diagram depicting one embodiment of a water heating system where one or more heat exchangers are used and the water heating system includes a bypass conductor. The water heating system 52 includes a cold side conductor 62, a hot side conductor 64, a pump 66, a bypass conductor 58, at least one heat exchanger 76, a heat exchanger inlet temperature sensor 68 disposed on the inlet of one of the three heat exchangers 76, a heat exchanger outlet temperature sensor 70 disposed at an outlet or exit nozzle 74 of one of the three heat exchangers 76, a system outlet temperature sensor 56 disposed on the exit end of the hot side conductor 64 and a system inlet temperature sensor 68 disposed on the receiving end of the cold side conductor 62. As shown, each heat exchanger has its own inlet temperature sensor. However, in this embodiment, only one inlet temperature sensor is used as each heat exchanger experiences a flow originating from a common source. As shown, each heat exchanger has its own outlet temperature sensor. The cold side conductor 62 includes a receiving end and a closed end. The hot side conductor 64 includes an exit end and a closed end. In one embodiment, the hot side conductor 64 is configured to hold a volume of water of from about 0.5 to about 2 gallons. In one embodiment, the fluid conductor of a heat exchanger 76 is a tubing having a size of about ¾ inch. The bypass conductor 58 includes a first end and a second end, wherein the first end of the bypass conductor 58 is fluidly adapted to the receiving end of the cold side conductor 62 and the second end of the bypass conductor is fluidly adapted to the exit end of the hot side conductor 64. In one embodiment, the bypass conductor 58 is a tubing having a size of from about 0.5 to about 1.5 inches. Each heat exchanger 8 includes a flow valve 72. The pump 66 increases pressure of water delivered to points of use and negates the pressure drop across heat exchangers 76. Although, with the positive pressure generated by the pump 66, delivery of water is considered satisfactory for some, for others, the increased pressure may come as a surprise, e.g., when used in a sink or shower. The receiving end 48 of the cold side conductor 62 is configured to be connected to a cold water supply manifold 44 or a port where unheated incoming water is supplied. The exit end 50 of the hot side conductor 64 is configured to be connected to a hot water supply manifold 46 or a port where now heated or hot water is sent out of the water heater and eventually to points of use. The pump 66 is configured to generate a flow through each of the heat exchangers 76. Shown in FIG. 1 are three heat exchangers 76 although any suitable number of heat exchangers may be used to collectively meet the demand requested through the hot water supply manifold 46 by hot water users. A valve 60 is provided to control flow through the bypass conductor 58. This valve 60 is normally disposed in the open state, except when two conditions have been encountered. First, if system outlet temperature sensor 56 has been determined to have ceased functioning and when it is relied upon for generating hot water, e.g., as inferred from a sudden loss of input signals from this sensor, valve 60 is closed to prevent any flow through it. In producing hot water, unheated water is simply received at 48, sent through the cold side conductor 62 before entering the heat exchangers 76 to be heated. Heated water empties into the hot side conductor 64 and proceeds to exit via the hot side conductor 64. Second, if the pump 66 has been determined to have ceased to function, e.g., as inferred from a lower than expected flowrate detected at any one of the flow valves of package 72, valve 60 is also closed to prevent any flow through it. A failed pump 66 does not prevent a flow that is caused by a hot water demand at one or more points of use. If a pump has been determined to have failed, hot water demands are serviced in the same manner as in the case where the system outlet temperature sensor 56 has failed. In general, a failure can be logged for purposes of problem diagnosis at a later time. It may also be communicated to service personnel in real time or at a later time. As shown herein, each heat exchanger 76 is equipped with an inlet temperature sensor 68 and an outlet temperature sensor 70. If any one of the inlet temperature sensors fails, at least one of the remaining functional inlet temperature sensors is relied upon until the condition is corrected. Alternatively, a system inlet temperature sensor 54 may be used to provide a rough representation for any one of the heat exchangers 76. If any one of the outlet temperature sensors fails, at least one of the remaining functional outlet temperature sensors is relied upon until the condition is corrected. These limp along modes prevent the need for a complete shutdown of the water heating system such that the water heating system can continue to service points of use until corrective actions can be taken. It is critical for the water heating system to remain operational even when at least one of the flow devices of the system has malfunctioned, until such time when the system can be repaired. Therefore, the earliest opportunity for such a system to self-diagnose is during a power-on process of the system as shown in the ensuing figures. During the first power-up process upon installation of a fluid system, service personnel responsible for installation are typical on-site and ready to address any issues that arose from the power-up self test of the fluid system. It typically is not an option to cycle up a water heating system when there are no requests for hot water as deadheading of the system is undesirable when the pump is turned on. The power-on self-test is akin to a test of an exerciser. An exerciser refers to a diagnostic routine executed or run outside of a normal operation of a tested device. The diagnostic routine may involve deliberately turning on or off one or more components at various times and in various sequences to produce responses or property changes of the tested device such that they may be obtained and evaluated in order to determine whether the responses meet expected results. This diagnostic routine is normally undesired as a request for hot water would involve all components or devices of the water heating system, for extended periods of time, that contribute to water heating to cycle up and cause undesirable deadheads. However, a fluid system shown in FIG. 1 includes a bypass conductor which serves a path for the fluid system to avoid deadheads as recirculations can occur within the fluid system itself.

Figure 2:
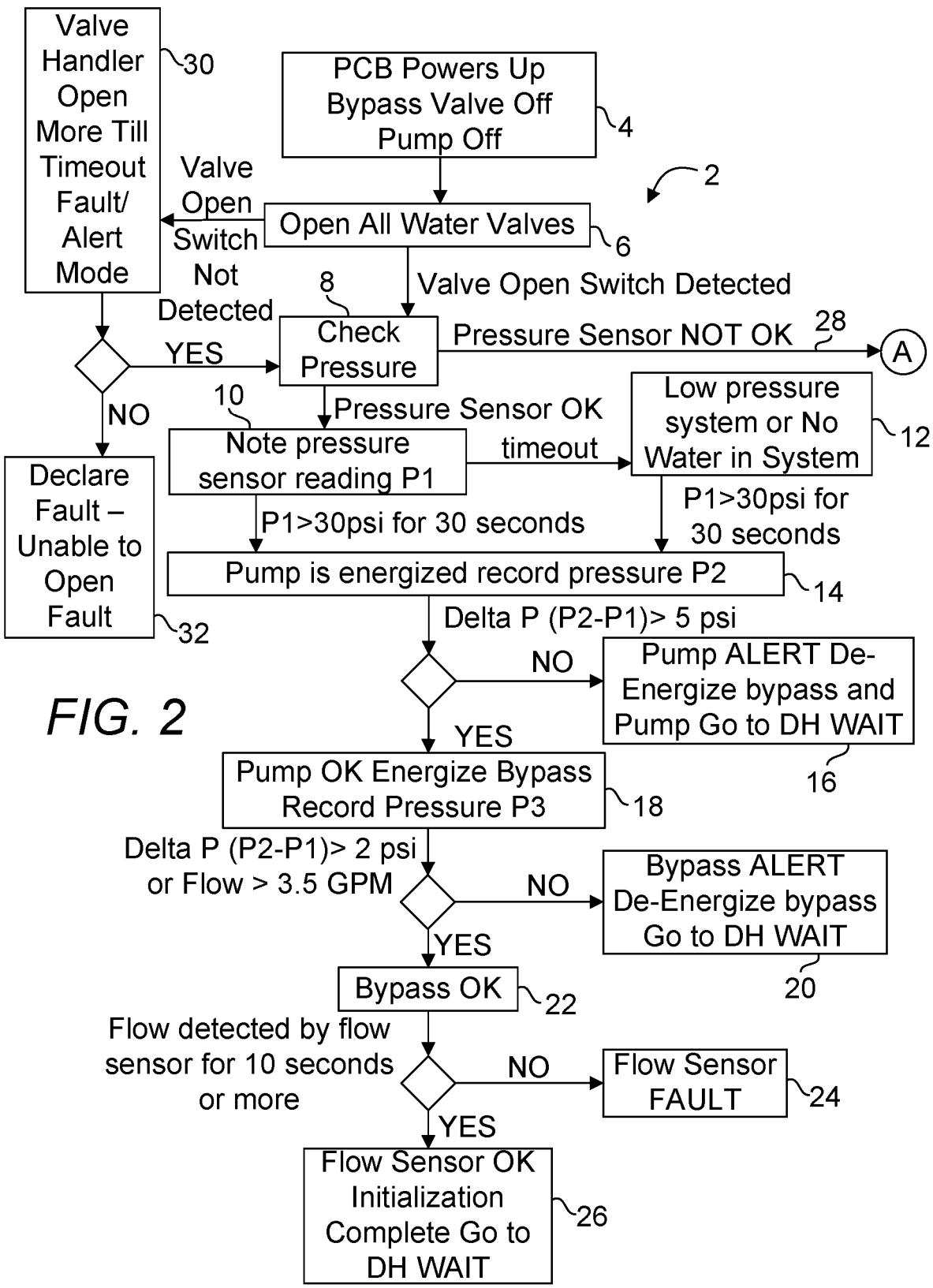
FIGS. 2 and 3 are diagrams depicting a diagnostic method useful for ascertaining the proper functioning of the flow devices of a fluid system.
Figure 3:
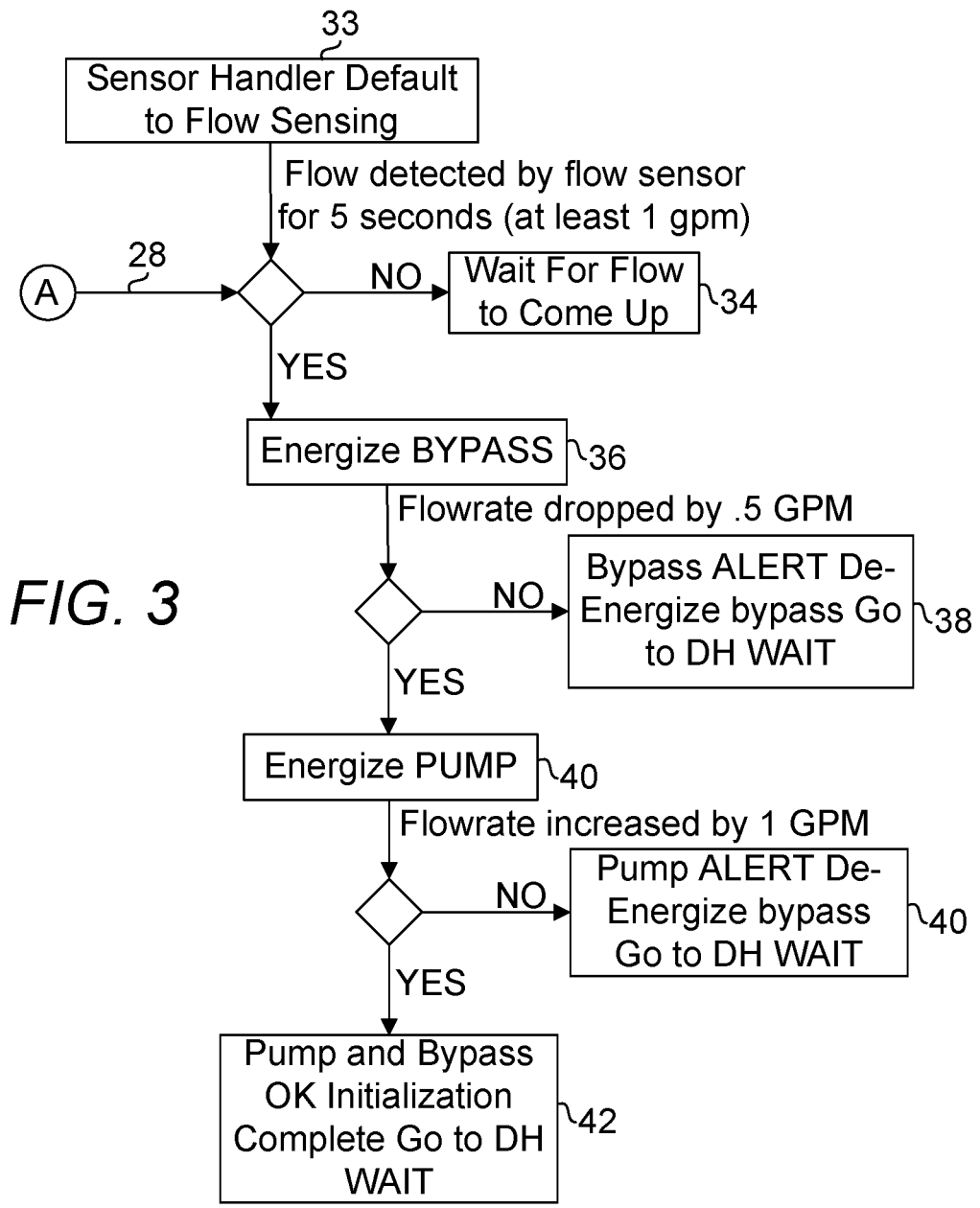

FIGS. 2 and 3 are diagrams depicting a diagnostic method useful for ascertaining the proper functioning of the flow devices of a fluid or water heating system. The fluid system as shown in FIG. 1 includes at least one of at least one fluid heater 76, a bypass valve 60 connected in parallel to the at least one fluid heater 76, at least one valve of package 72 for controlling a fluid flow through the fluid system, at least one pump 66, at least one pressure sensor of package 72 for obtaining a pressure of the fluid flow, at least one valve open switch of package 72 for detecting a valve open condition and at least one flow sensor of package 72 for obtaining a flowrate of the fluid flow. Disclosed herein is a diagnostic method 2 for determining whether flow devices of a fluid system, e.g., the system shown in FIG. 1, function properly. At least one control device is functionally connected to at least some of the flow control devices of the fluid system, e.g., pump 66, bypass valve 60, flow valve and pressure sensor of package 72, etc., such that these flow control devices can be controlled according to hot water demands. The bypass valve 60 and pump 66 were disposed in their respective off state as shown in state 4 when the power switch to the fluid system is just being turned on. The method includes first opening, as shown in step 6, every flow valve of each of the three packages 72. Each valve open switch, also of each package 72, is used to detect a valve open condition. If a valve open condition is detected, a corresponding pressure sensor is checked as in step 8 whether it is functional. Pressure sensor readings are taken as shown in step 10. If the pressure sensor readings are deemed too low, a delay is built in the pressure sensor readings-taking step 12 before entering the next step, i.e., step 14. If a valve open condition is not detected, a valve handler is used to exercise a flow valve of the same package 72. If the pressure sensor is considered functional and the pressure sensor indicates a proper pressure, the pump 66 is turned on as in step 14. Otherwise flow control is defaulted to flow sensing instead as shown in path 28. If a sufficient pressure increase, e.g., about 5 psi, in the fluid flow, is detected by the pressure sensor after turning on the pump 66, the bypass valve 60 is opened as in step 18, otherwise a pump alert is raised as in step 16. If the fluid flowrate as sensed by the flow sensor does not drop sufficiently, a bypass alert is raised as in step 20 as an opening of the bypass valve 60 should have allowed more flow through it while causing flows through the heat exchangers 76 to decrease. An alert, as used herein, refers to a warning intended to be communicated to service personnel but otherwise does not indicate a debilitating malfunction which can cause the shutdown of the fluid system. A fault, as used herein, refers to a problem more severe than an alert and it should be actively sought to be resolved. Nevertheless, a fault does not necessarily mean that the fluid system is required to be shut down as fluid flow control can still be achieved by using alternative means. If the pressure of the fluid flow as sensed by the at least one pressure sensor increases sufficiently, the pump 66 (as shown in step 18) and the bypass valve 60 (as shown in state 22) are considered functional. Referring back to step 8, if a valve open switch is not detected or if a valve fails to open, the valve open handler is allowed to continue to command the valve to open until a timeout fault or until an alert mode has been activated as shown in step 30. A fault is declared as in step 32 if the valve still is not open after a timeout. If an insufficient flowrate of the fluid flow is detected, a flow sensor fault is raised as in step 24, otherwise the flow sensor is indicated as functional in state 26.

During flow sensing and turning our attention now to FIG. 3, the proper functioning of bypass valve 60 is determined as shown in step 36 if the pressure sensor is considered dysfunctional. In step 33, a sensor handler responsible for the pressure sensor is defaulted to flow sensing as the pressure sensor is deemed dysfunctional. In step 34, a delay is instituted as shown in step 24 when an insufficient flowrate of the fluid flow through a heat exchanger has been detected. If a sufficient flowrate of the fluid flow has been detected, bypass valve 60 is opened. In one embodiment, the sufficient flowrate of the fluid flow is at least about 1 GPM. In one embodiment, if the bypass valve is considered functional or the flowrate of a fluid flow drops by at least about 0.5 GPM, the pump is checked to determine whether it functions properly. If bypass valve 60 is considered dysfunctional, a bypass valve alert is raised as shown in step 38. If the pump 66 is considered dysfunctional, a pump alert is raised as shown in step 40. In state 42, both pump 66 and bypass valve 60 are considered functional.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A diagnostic method for assessing the operational performance of a fluid system, the fluid system comprising at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, said method comprising:

(a) determining whether the at least one pressure sensor is functional and if the at least one pressure sensor is considered functional, determine whether the at least one pump is functional by determining a pressure increase of at least about 5 psi in the fluid flow has been detected by the at least one pressure sensor, if the at least one pump is considered dysfunctional, de-energize the at least one pump, or if the at least one pump is considered functional, energize the bypass valve and determine whether the bypass valve is functional and if the bypass valve is considered functional by determining whether a pressure change as detected by the at least one pressure sensor of over about 2 psi and a flowrate of the fluid flow over about 3.5 GPM detected by the at least one flow sensor have occurred, determine whether the fluid flow has not been detected to be in existence for at least about 10 seconds, if the fluid flow has not been detected to be in existence for at least about 10 seconds, raise a flow sensor fault; and (b) otherwise if the at least one pressure sensor is considered dysfunctional, using the at least one flow sensor to determine whether the bypass valve is functional, if the bypass valve is considered functional by determining whether a flowrate of the fluid flow as detected by the at least one flow sensor has decreased by about 0.5 GPM after the bypass valve has been energized, determine whether the at least one pump is functional by determining whether a flowrate of the fluid flow increases by about 1 GPM, if the at least one pump is considered dysfunctional, raise a pump alert and de-energize the bypass valve.

2. A diagnostic method for assessing the operational performance of a fluid system, the fluid system comprising at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow, at least one valve open switch for detecting a valve open condition and at least one flow sensor for obtaining a flowrate of the fluid flow, said method comprising:

(a) opening the at least one flow valve;

(b) determining whether the at least one valve open switch detected a valve open condition, if said valve open condition is detected, determine whether the at least one pressure sensor is functional, otherwise use a valve handler to exercise said at least one flow valve, if the at least one pressure sensor is considered functional and the at least one pressure sensor indicates a proper pressure, energize the at least one pump, otherwise default to flow sensing, if a pressure increase of at least about 5 psi in the fluid flow is detected by the at least one pressure sensor after turning on the at least one pump, energize the bypass valve and the at least one pump and the bypass valve are considered functional, otherwise raise a pump alert and de-energize the bypass valve, determine whether the bypass valve is functional and if the bypass valve is considered functional by determining whether a pressure change as detected by the at least one pressure sensor of over about 2 psi and a flowrate of the fluid flow over about 3.5 GPM detected by the at least one flow sensor have occurred, determine whether the fluid flow has been detected to be in existence for at least about 10 seconds, if the fluid flow has not been detected to be in existence for at least about 10 seconds, raise a flow sensor fault; and (c) during flow sensing, determining whether the bypass valve is functional if said pressure sensor is considered dysfunctional, energize the bypass valve and determine whether the bypass valve is functional, if the bypass valve is considered dysfunctional, raise a bypass alert and de-energize the bypass valve, or if bypass valve is considered functional, energize the at least one pump and determine whether the at least one pump is functional, if the at least one pump is considered dysfunctional as the flowrate of the fluid flow does not increase by at least about 1 GPM, raise a pump alert and de-energize the bypass valve.

* * * * *